(12) United States Patent
Criel

(10) Patent No.: US 11,142,061 B2
(45) Date of Patent: Oct. 12, 2021

(54) SYSTEM FOR A MOTOR VEHICLE

(71) Applicant: Plastic Omnium Advanced Innovation and Research, Brussels (BE)

(72) Inventor: Bjorn Criel, Sint-Martens-Lennik (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 223 days.

(21) Appl. No.: 15/533,152

(22) PCT Filed: Dec. 3, 2015

(86) PCT No.: PCT/EP2015/078485
§ 371 (c)(1),
(2) Date: Jun. 5, 2017

(87) PCT Pub. No.: WO2016/091709
PCT Pub. Date: Jun. 16, 2016

(65) Prior Publication Data
US 2017/0361703 A1    Dec. 21, 2017

(30) Foreign Application Priority Data
Dec. 9, 2014 (FR) .................................... 1462126

(51) Int. Cl.
*B60K 15/03* (2006.01)

(52) U.S. Cl.
CPC .. *B60K 15/03006* (2013.01); *B60K 15/03177* (2013.01); *B60K 2015/03039* (2013.01); *B60K 2015/03447* (2013.01); *B60K 2015/03493* (2013.01)

(58) Field of Classification Search
CPC .... B29C 2049/2017; B29C 2049/2008; B29C 2049/2021; B29C 2049/2026; B65D 39/0052; B65D 35/10; B65D 35/12; B65D 15/00; B65D 15/14; B65D 15/18
See application file for complete search history.

(56) References Cited

U.S. PATENT DOCUMENTS 1,921,021 A  *  8/1933  Bungay .................. B65D 35/12
                                                   29/507
3,955,934 A  *  5/1976  Tizzi ....................... B44C 1/225
                                                   428/573
4,356,926 A  *  11/1982  Priestly ................. B29C 66/742
                                                   156/73.1

(Continued)

FOREIGN PATENT DOCUMENTS

CN    102218810 A    10/2011
CN    102271894 A    12/2011

(Continued)

OTHER PUBLICATIONS

International Search Report dated Feb. 15, 2016 in PCT/EP2015/078485 filed Dec. 3, 2015.

*Primary Examiner* — Andrew T Kirsch
(74) *Attorney, Agent, or Firm* — Oblon, McClelland, Maier & Neustadt, L.L.P.

(57) ABSTRACT

A system for a motor vehicle, the system including a container having a side made of a plastic material, and a component sealingly attached to the container side. The component has at least one portion provided with microgrooves that form a sealing area between the component and the container side.

11 Claims, 4 Drawing Sheets

(56) References Cited

U.S. PATENT DOCUMENTS

| | | | |
|---|---|---|---|
| 5,351,462 A * | 10/1994 | Anderson | B29C 49/20 |
| | | | 264/524 |
| 2005/0081559 A1* | 4/2005 | McGregor | F25B 43/006 |
| | | | 62/503 |
| 2007/0102389 A1* | 5/2007 | Hoepner | B65D 55/024 |
| | | | 215/235 |
| 2009/0239436 A1 | 9/2009 | Ohnstad et al. | |
| 2011/0210475 A1 | 9/2011 | Strack et al. | |
| 2011/0266723 A1 | 11/2011 | Criel et al. | |
| 2012/0205374 A1* | 8/2012 | Klumpen | A61J 1/1406 |
| | | | 220/200 |
| 2014/0295323 A1 | 10/2014 | Schulze | |

FOREIGN PATENT DOCUMENTS

| | | | |
|---|---|---|---|
| CN | 104074972 A | 10/2014 | |
| FR | 552 288 A | 4/1923 | |

\* cited by examiner

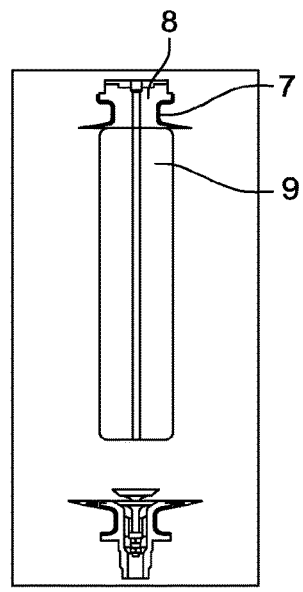
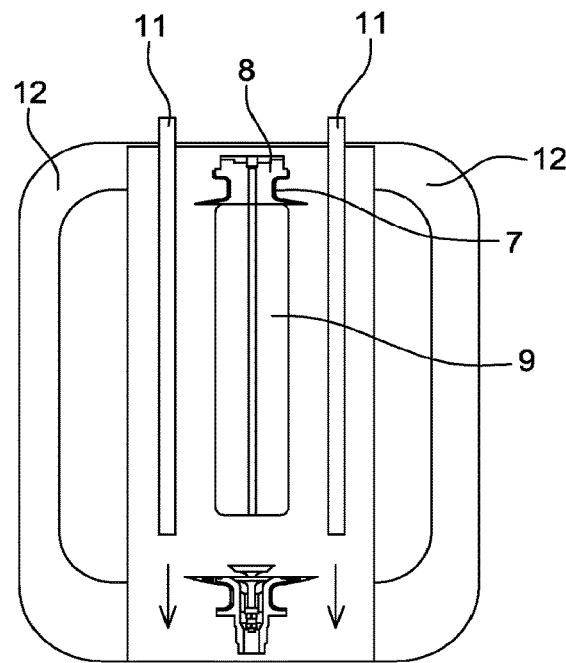
Fig. 3              Fig. 4
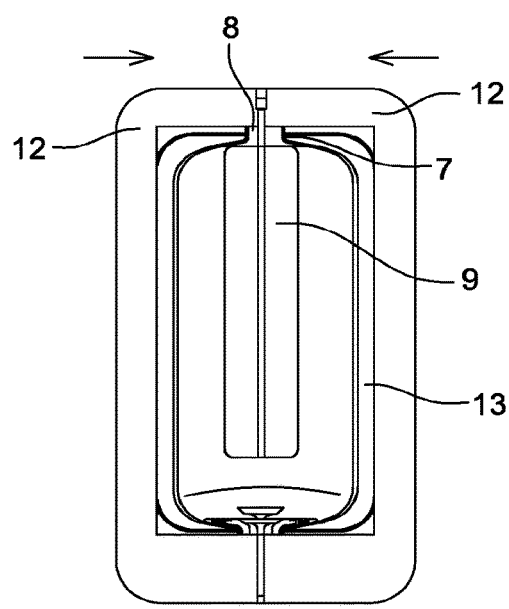
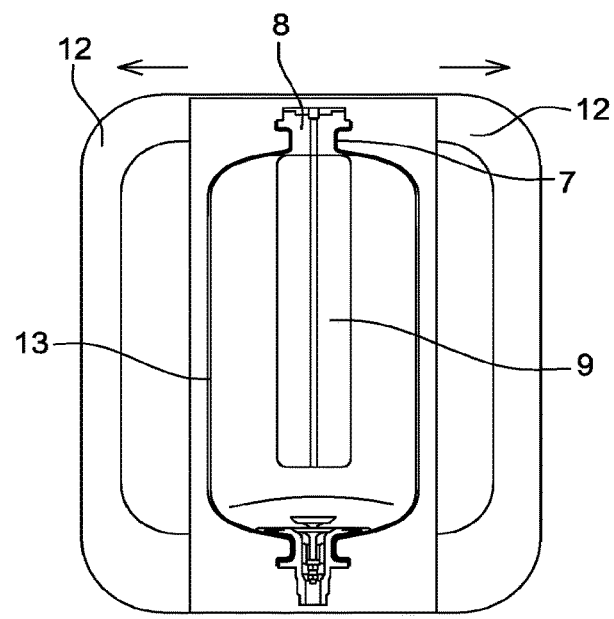
Fig. 5              Fig. 6

SYSTEM FOR A MOTOR VEHICLE

The invention relates to systems for motor vehicles, in particular tanks.

High pressure tanks are known.

For example, high pressure gas (CNG, LPG, hydrogen, nitrogen, etc.) tanks for vehicles are known, the liners of which are manufactured by blow-molding or injection-molding of a molten plastic parison. Generally, these liners are enclosed in filaments of composite materials embedded in a resin or matrix (for example thermoset or thermoplastic). Therefore, these types of high pressure tank are sufficiently strong while being lighter than metal high pressure tanks.

High pressure tanks for pressure storage are also known. These tanks store energy in the form of pressure of a compressed gas inside a bladder or in a piston chamber within the liner. Energy is sent when required to systems outside the tank.

To provide a connection between the inside and the outside of the liner of a tank, metal components are placed on the liner, the function of these components being to allow metal parts to be connected to the non-metal liner, while ensuring optimum sealing.

The same requirements in terms of connection and sealing may also be found with fuel tanks. In this case, the fuel is contained directly in the tank (constituting a liner).

In the rest of the description, the part of the tank formed by rigid walls retaining the fluid inside the tank will be called a "container". This container may be a liner, as in the case of the gas tanks described above, or the wall of the tank, as in the case of fuel tanks.

Thus, whether it is a case of fuel tanks, hydrogen tanks or more generally gas tanks, it is often necessary to secure valves or pipes to the containers so as to be able to fill and empty the tanks. Cam locking rings are also secured thereto, for opening and closing the tank.

However, these elements are generally made of metal or of a material different from that of the container, so that it is difficult to weld them to the plastic container while ensuring sealing between these two materials. Seals are therefore added.

In the case of pressure storage tanks, metal inserts are fitted to act as an interface between the outside of the tank and a bladder or a piston chamber located inside the liner. Known types of inserts are valves. They are secured to the plastic liner, this liner being produced by blow-molding a parison. Sealing is also achieved by placing a seal between the insert and the liner.

However, in all cases, first of all, the seal constitutes an additional part which requires a specific assembly operation. In particular, it is necessary to provide a housing for the seal on the insert. Second, with such an arrangement there is the risk of incorrect positioning or movement of the seal, which can give rise to imperfect sealing. Finally, it is difficult to maintain sealing over time because of creep that may eventually occur in the plastic, in the area where the seal is compressed.

One aim of the invention is to provide a sealing system without any risk of leakage.

According to the invention, there is provided a system for a motor vehicle, comprising:
a container comprising a plastic wall, and
a component secured in a sealed manner to the wall of the container, in which system the component comprises at least one portion provided with microgrooves. The microgrooves are present on the surface of the component and ensure sealing between the component and the wall of the container.

Thus, sealing between the component, which is generally made of metal, and which is for example an insert or a valve, and the container which is made of plastic, is ensured by the microgrooves. The microgrooves are small striations etched on the component. They are regular reliefs. The plastic layer of the container penetrates into the microgrooves and thus prevents the risk of leakage. This also avoids the use of seals and therefore also the costly operations involved in fitting such a seal. Lastly, the disadvantages resulting from the use of a seal, such as the movement of the seal due to creep of the plastic, are avoided.

Preferably, the microgrooves have at least one of the following features:
they are between 10 and 100 micrometers wide;
they are between 50 and 200 micrometers deep;
each microgroove is separated from a neighboring microgroove by a distance ranging from 100 to 1000 micrometers;
they have an undercut shape. As regards the undercut shape, it is oriented in the direction which makes it possible to increase the mechanical strength between the portion of the component provided with the microgrooves and the container to which it is secured. Thus, when a torque is applied to the component, or when a compressive or rotational pulling force is applied, the microgrooves make it possible to maintain the mechanical strength of the assembly.

Advantageously, the microgrooves are all parallel to one another.

Preferably, there are at least two types of microgrooves, the types differing from one another, for example, by the direction of the microgrooves.

Advantageously, the portion provided with microgrooves comprises a housing in which a seal is housed. Alternatively, such a housing may be positioned in the vicinity of the portion provided with microgrooves.

Thus, the seal is not dispensed with compared to the prior art, but the durability of the sealing between the component and the container is improved. Sealing could become impaired over time, for example owing to changes in size due to temperature or due to swelling of the fluid stored in the container. It is therefore advantageous to ensure stability in terms of size and positioning between the container and the component, in particular in, or close to the zone of compression of the seal. In this case, at least one zone of microgrooves is included close to this zone of compression of the seal.

Preferably, an adhesive material is located on the portion provided with microgrooves.

The adhesive material used may be functionalized polymer, for example maleic anhydride polyethylene.

Thus, the presence of the microgrooves and of a seal and/or of an adhesive material may be combined in order to reinforce sealing between the component and the container.

Advantageously, the component and the portion provided with microgrooves form a one-piece assembly.

Thus, the portion provided with microgrooves forms an integral part of the component. In other words, it is impossible to separate off the portion of the component without destroying at least the portion or the component.

Preferably, the component and the portion provided with microgrooves are two assembled parts.

Thus, a portion provided with microgrooves is integrated into a conventional component. The component and the portion are thus two separable elements.

Advantageously, the portion provided with microgrooves comprises metal.

Preferably, the component constitutes an insert capable of connecting the container to a system external to the container.

Thus, the component allows, for example, the connection between a bladder, a piston chamber of the container, and the outside of the container. The component may also constitute a valve on a fuel tank or a CNG or hydrogen gas tank.

Advantageously, the component constitutes an interface plate between the inside and the outside of the tank.

Thus, for example, the component may be used to cover, during the manufacture of the tank, an orifice through which internal elements have been passed into the tank. The component may also serve as an interface between the tank and the outside, if it is desired to secure an external part to the tank.

Preferably, the container is capable of containing liquid and/or gas.

Also provided is a method for manufacturing an assembly comprising a container of a motor vehicle tank and a component comprising at least one portion provided with microgrooves, which comprises performing the following steps:
 extrusion of a molten plastic parison, which will become the container;
 bringing the parison into contact with the portion of the component;
 blow-molding the parison so as to form the container.

Therefore, bringing the molten plastic parison into contact with the portion allows the parison to enter the microgrooves of the portion during the manufacture of the assembly. This ensures sealing between the future container and the component that is secured thereto.

Preferably, the following steps are carried out:
 positioning the component beforehand between two cavities of a mold;
 after extrusion, closing the mold;
 when the parison is brought into contact, compressing the parison on the micro-grooves by closing the mold.

There is also provided a method for manufacturing an assembly comprising a container of a motor vehicle tank and a component comprising at least one portion provided with microgrooves, in which the following steps are carried out:
 overmolding the portion of the component with a material capable of being welded with a material constituting the container;
 positioning a plastic parison between two cavities of a mold;
 closing the mold, causing the parison to come into contact with the overmolded portion of the component;
 welding the parison to the overmolded portion of the component;
 blow-molding the parison so as to form the container.

Preferably, the microgrooves of the portion are obtained by the use of a fiber laser. The characteristics of the laser beam make it possible to obtain optimized shapes for an interface between the metal of a component and the plastic of a container.

Advantageously, the methods according to the invention thus also comprise performing the following steps:
 first, positioning a component without microgrooves in a station comprising a fiber laser;
 etching of the microgrooves with the laser on a portion of the component;
 positioning the component comprising the portion provided with microgrooves in a blow-molding station.

There is also provided a method for manufacturing an assembly comprising a container of a motor vehicle tank and two components, each comprising at least one portion provided with microgrooves, in which the following steps are carried out:
 positioning of two components without microgrooves in a station comprising a fiber laser;
 etching of the microgrooves with the laser on a portion of each component.
 positioning the two components comprising the portions provided with microgrooves in a blow-molding station;
 extrusion of a molten plastic parison, which will become the container;
 bringing the parison into contact with the portions of the two components;
 blow-molding the parison so as to form the container.

Advantageously, the step of bringing into contact in the methods according to the invention is carried out by pressure or compression.

Preferably, the step of bringing into contact in the methods according to the invention is carried out by blow-molding.

Advantageously, the step of bringing into contact in the methods according to the invention is carried out by injection-molding.

Alternatively, instead of extruding a parison, sheets are extruded according to the method described in the publication EP-1110697-A2.

A clearer understanding of the invention will be achieved on reading the following description provided solely by way of example and with reference to the drawings, in which:

FIGS. 3 to 6 show a method for manufacturing a liner;

Figure 12:
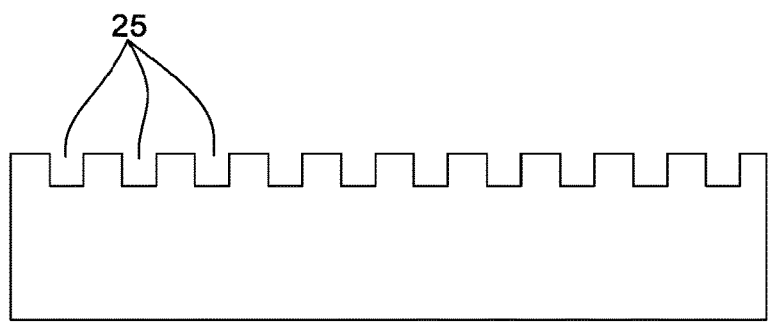
Figure 13:
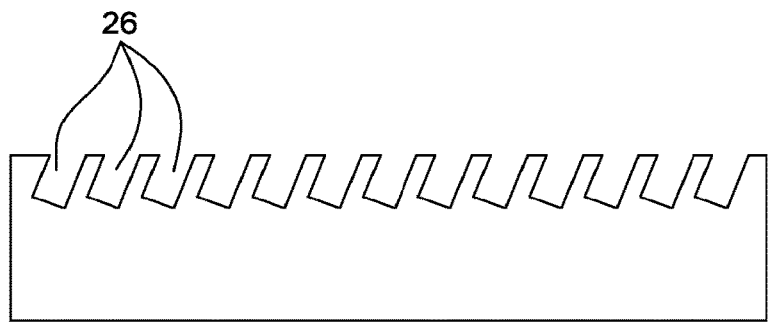
Figure 14:
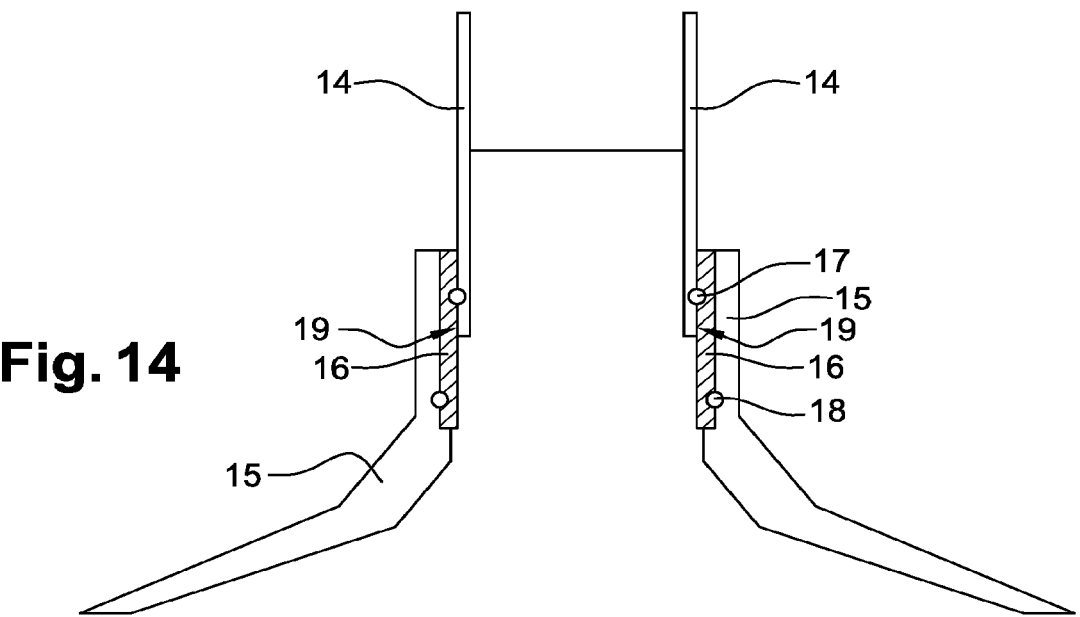
Figure 15:
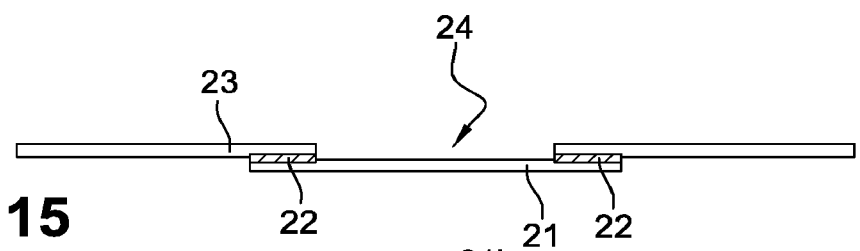
Figure 16:
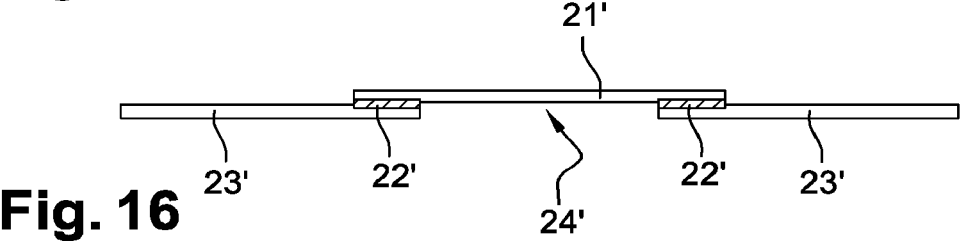

FIGS. 7 to 11 schematically show types of microgrooves;

FIGS. 12 and 13 show two types of microgroove in transverse view;

FIG. 14 shows an assembly according to an embodiment in accordance with the invention;

FIGS. 15 and 16 show an assembly according to another embodiment; and

Figure 17:
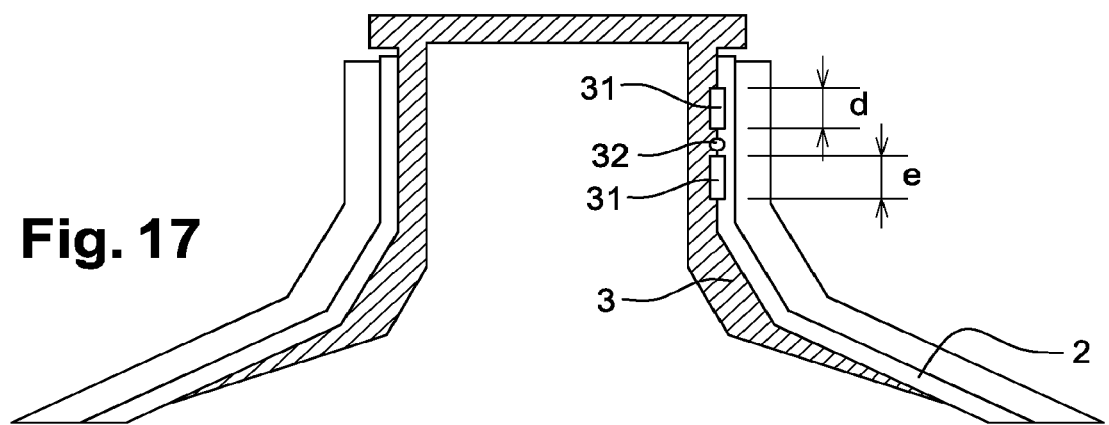

FIG. 17 shows a detail of a liner according to another embodiment.

Figure 1:
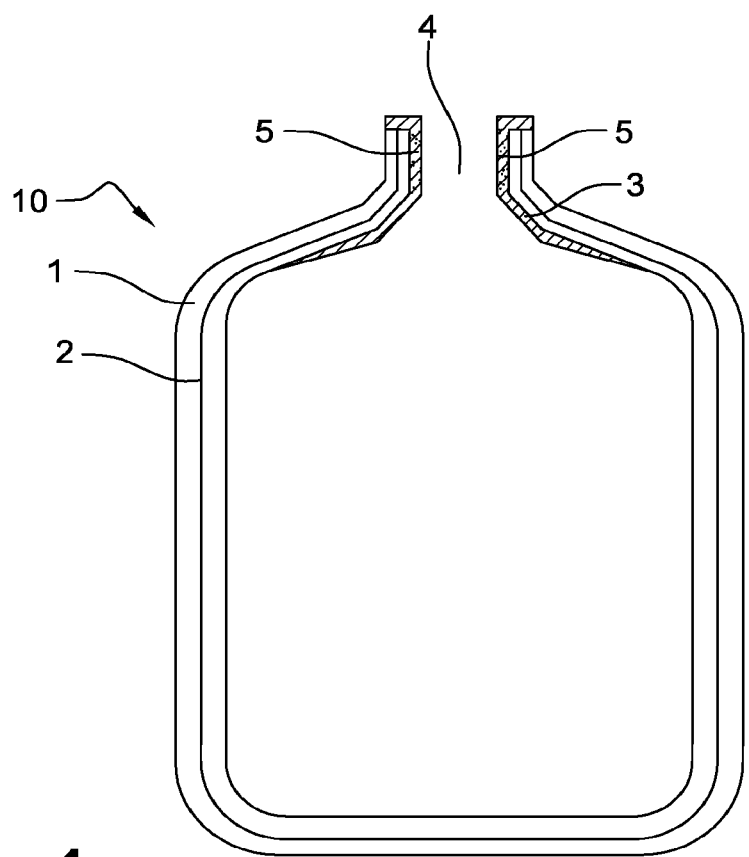
FIG. 1 shows a liner of a tank in median longitudinal section.
Figure 2:
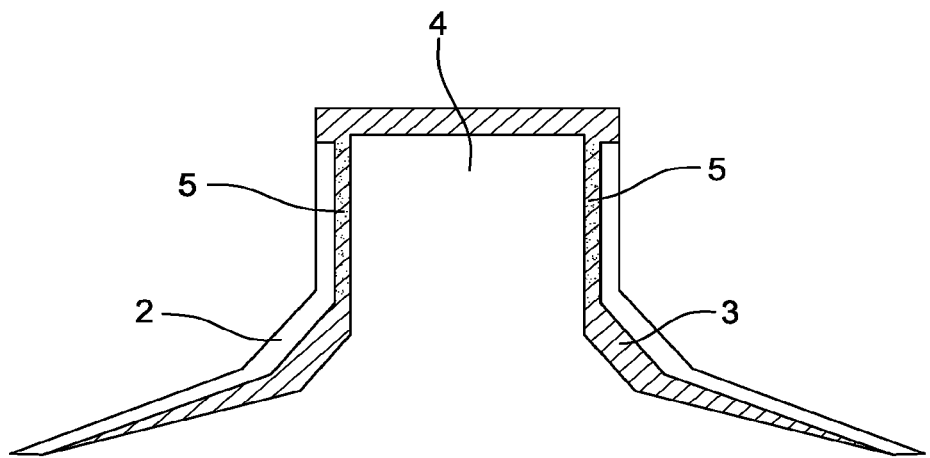
FIG. 2 shows a detail of this liner on a large scale.
Figure 7:
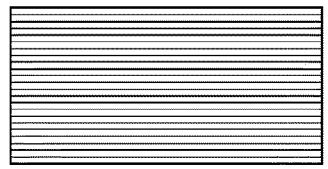
Figure 8:
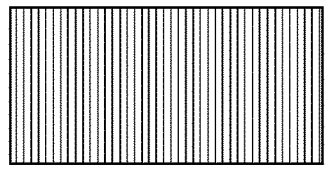
Figure 9:
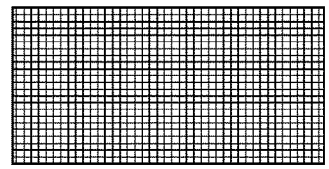
Figure 10:
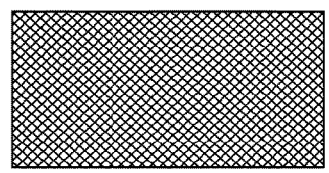
Figure 11:
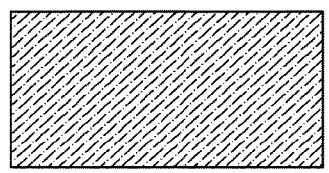

FIG. 1 shows a tank 10 of a motor vehicle. This tank is capable of containing liquid under pressure and/or gas under pressure. It comprises a liner 2 made of thermoplastic material, constituting a container within the meaning of the invention, as well as a winding of fibers 1 made of epoxy resin, all around the liner 2. It also includes an opening 4, through which it can be connected to external components. For example, a tank serving as a pressure storage tank could be connected to a gas or oil conduit. A fuel, CNG or hydrogen tank would be connected through this opening to engine systems. In order to ensure the connection between the liner 2 and the outside of the tank 10, a metal component 3 is used. This component may be an insert, a valve, or any type of interface capable of effecting the connection between the inside of the liner and the outside of the liner. Since the liner 2 is made of a plastic material, for example HDPE, sealing is provided by microgrooves located in the vertical zone 5 on the surface of the metal insert. The zone 5, which constitutes the portion provided with microgrooves according to the invention, is also shown schematically in FIG. 2, which shows a view on a larger scale of the tank 10 at the opening 4. The microgrooves are etched by a fiber laser prior to the fitting of the insert within the liner 2.

In another embodiment of the invention shown in FIG. 17, a seal 32 is put in place between the component 3 and the liner 2. On either side of the seal 32, the component 3 has zones of microgrooves 31 extending respectively over distances d and e. These distances may be identical or different. Thus, the use of microgrooves and a seal is combined in order to improve sealing. In particular, the microgrooves 31 located on either side of the seal 32 make it possible to prevent the seal 32 from moving, under the effect of stresses such as swelling of the fluid stored in the liner.

A high pressure tank for a vehicle may thus be manufactured in the following manner, with reference to FIGS. 3 to 6:

microgrooves 7 are created on the surface of the component, in this case the metal insert 8, by means of a laser located in a fiber laser station;

the insert is secured to a bladder 9;

a parison 11 is extruded;

the molten plastic parison 11 is placed in an open mold 12;

the mold 12 is closed, as shown in FIG. 5, and at the moment of closing, the parison 11 is brought into contact with the metal surface of the insert 8 so as to cause the plastic of the parison to penetrate into at least some of the microgrooves 7;

the parison 11 is blow-molded so as to form the liner 13;

the mold 12 is opened so as to allow removal of the liner comprising the metal insert.

Alternatively, the liner could also be blow-molded before the parison is brought into contact with the portion of the insert comprising the microgrooves.

The microgrooves of the insert may be brought into contact with the molten plastic parison in various ways:

by virtue of the blow-molding of the parison, which presses the parison against the portion of the component provided with microgrooves;

by virtue of pressure from a jack on the parison 11, in order to cause the latter to penetrate as much as possible into the microgrooves 7;

by virtue of pressure from a jack on the metal component, in this case an insert 8, in order to cause the parison 11 to penetrate as much as possible into the microgrooves 7 of the insert 8. Such a jack may for example be present on a core located inside the mold. Bringing into contact has the effect of filling the microgrooves with the plastic material of the liner.

It would also be possible to manufacture a liner comprising two metal components in this way. The method would be the same except that what applies to one component would apply to both components.

An example of a metal component, in this case an insert, has been used but the invention may be implemented with a non-metal component.

The microgrooves may take several forms, as shown schematically in FIGS. 7 to 11. In particular, they may be parallel to one another, or they may have different directions. Regarding their shape within the surface of the component, FIGS. 12 and 13 illustrate two possibilities in a non-limiting manner. The microgrooves 25 may be vertical, as shown in FIG. 12, or slightly inclined, as is the case of the microgrooves 26 in FIG. 13. They may also have an undercut shape. Inclined or undercut shapes make it possible to maintain good mechanical strength between the liner and the component having the microgrooves, in particular when stresses are exerted on the liner or the component.

In another embodiment of the invention which is not shown, a metal component is first overmolded with a plastic suitable for being welded to the plastic liner of the tank. Overmolding makes it easier to weld the metal component to the liner. In this case, microgrooves are created on the metal surface of the component before overmolding. The microgrooves make it possible to ensure sealing between the metal surface of the component and the overmolded material. The method for manufacturing a tank comprising, for example, an overmolded insert is the same as the above method, except that the insert is overmolded first, in such a way that the plastic overmolding the insert becomes embedded in at least some of the microgrooves located on the metal surface of the insert. The liner is welded to the overmolding of the insert during blow-molding of the liner.

FIG. 14 shows an assembly according to another embodiment of the invention. The liner 15 of the tank has a metal component 16 attached to the liner. This component may be a tube, a valve, or any connecting insert. The tank may be, for example, a fuel tank. The connection between the liner 15 and the outside of the tank is made by means of the component 16. To be specific, an external conduit 14 is secured to the inside of the component 16. It may be secured using any means (clipping, screwing). In addition to the microgrooves 19 present on the surface of the component, seals 17 and 18 are put in place to reinforce sealing. A seal 17 is thus placed between the insert 16 and the conduit 14. Another seal 18 is placed between the insert 16 and the liner 15. Thus, the effects of the microgrooves 19 and the seals 17 and 18 are combined in order to optimize the sealing of the assembly.

In another embodiment shown in FIGS. 15 and 16, a metal component 21 which has a portion 22 provided with microgrooves is used as a plug for a fuel tank 23. To be specific, during the manufacture of the fuel tank 23, the latter comprises an orifice 24 in order to allow internal elements to be placed inside the tank 23. Once these elements have been fitted, it is necessary to plug the orifice 24. The metal component 23 is thus welded to the tank on the outside of the tank by bringing the wall of the tank, which here constitutes the container within the meaning of the invention, into contact with the microgrooves of the portion 22 so as to ensure sealing of the tank 23. This welding takes place during the blow-molding of the tank. Thus, the parison, which is still soft, can penetrate into the microgrooves of the portion 22 of the metal part 21.

FIG. 16 shows a variant in which the metal part is secured inside the tank.

A tank according to the invention may be manufactured using a TSBM (twin-sheet blow-molding) method described in the publication EP-1110697-A2. Thus, instead of extruding a molten plastic parison, two sheets of molten plastic are extruded and then pressed together.

Similarly, injection-molding and thermoforming steps may be used to form the tank.

As explained previously, the component according to the invention may be made of metal, but also of a plastic different to that from which the container of the tank is made. It may also include a combination of metal and plastic.

Naturally, many modifications may be made to the invention without going beyond the scope of the invention.

The invention claimed is:

1. A system for a motor vehicle comprising:
an engine system,
a container made of plastic comprising a rigid plastic wall, and a component secured in a sealed manner to the rigid plastic wall of the container and arranged to ensure a connection between the container and the engine system, wherein the component comprises at least one portion which comprises metal, provided with microgrooves, and wherein the microgrooves are present on the metallic surface of the component and ensure sealing between the component and the rigid plastic wall of the container.

2. The system as claimed in claim 1, wherein the microgrooves have at least one of the following features:
the microgrooves are between 10 and 100 micrometers wide;
the microgrooves are between 50 and 200 micrometers deep;
each microgroove is separated from a neighboring microgroove by a distance ranging from 100 to 1000 micrometers;
the microgrooves have an undercut shape.

3. The system as claimed in claim 1, wherein the portion provided with microgrooves comprises a housing wherein a seal is housed.

4. The system as claimed in claim 1, wherein an adhesive material is located on the portion provided with microgrooves.

5. The system as claimed in claim 1, wherein the component and the portion form a one-piece assembly.

6. The system as claimed in claim 1, wherein the component and the portion are two assembled parts.

7. The system as claimed in claim 1, wherein the container is arranged for containing liquid and/or gas.

8. A method for manufacturing an assembly comprising a container made of plastic and comprising a plastic wall, of a motor vehicle tank and a component comprising at least one portion which comprises metal, the metallic portion being provided with metallic microgrooves, said method comprising the following steps:
extruding a molten plastic parison, which will become the container made of plastic;
bringing the plastic parison into contact with the metallic microgrooves provided on the metallic surface of the portion;
blow-molding the plastic parison so as to form the container made of plastic and create sealing between the component and the container.

9. The manufacturing method as claimed in claim 8, wherein the step of bringing into contact is carried out by pressure or compression.

10. The manufacturing method as claimed in claim 8, wherein the step of bringing into contact is carried out by blow-molding.

11. The manufacturing method as claimed in claim 8, wherein the step of bringing into contact is carried out by injection-molding.

* * * * *